United States Patent [19]

Nakauchi

[11] Patent Number: 4,870,506
[45] Date of Patent: Sep. 26, 1989

[54] COLOR SIGNAL CONVERSION METHOD FOR IMAGE COPYING

[75] Inventor: Kenji Nakauchi, Kanagawa, Japan

[73] Assignee: Fuji Photo Film Co., Ltd., Kanagawa, Japan

[21] Appl. No.: 134,117

[22] Filed: Dec. 17, 1987

[30] Foreign Application Priority Data

Dec. 17, 1986 [JP] Japan .................................. 61-300660

[51] Int. Cl.$^4$ .......................... G03G 15/01; H04N 1/46
[52] U.S. Cl. ..................................... 358/296; 358/300; 358/302; 358/75; 358/443; 346/150; 346/153.1; 346/160
[58] Field of Search ....................... 358/28, 29, 30, 43, 358/44, 45, 48, 75, 78, 80, 296, 300, 302, 280; 346/157, 150, 153.1, 160

[56] References Cited

U.S. PATENT DOCUMENTS 4,687,334  8/1987  Miyakawa .

FOREIGN PATENT DOCUMENTS 0144188  6/1985  European Pat. Off. .............. 358/80

Primary Examiner—C. L. Albritton
Assistant Examiner—Scott A. Rogers
Attorney, Agent, or Firm—Sughrue, Mion, Zinn, Macpeak & Seas

[57] ABSTRACT

In a color copier, color infidelities in the copied image resulting from overlapping spectral absorption characteristics of the cyan, magenta and yellow layers in the recording material and from the superposed spectral sensitivities of the red, green and blue decomposition systems in the reader/scanner of the original are compensated for by determining the mixture components in advance using a shade wedge, and subtracting such components during the copying process.

4 Claims, 5 Drawing Sheets

| | | | | | | | |
|---|---|---|---|---|---|---|---|
| 231 { | C | C | $C_{C1}$ | $C_{C2}$ | $C_{C3}$ | ------ | $C_{Cn-1}$ | $C_{Cn}$ |
| | | M | $M_{C1}$ | $M_{C2}$ | $M_{C3}$ | ------ | $M_{Cn-1}$ | $M_{Cn}$ |
| | | Y | $Y_{C1}$ | $Y_{C2}$ | $Y_{C3}$ | ------ | $Y_{Cn-1}$ | $Y_{Cn}$ |
| 232 { | M | M | $M_{M1}$ | $M_{M2}$ | $M_{M3}$ | ------ | $M_{Mn-1}$ | $M_{Mn}$ |
| | | Y | $Y_{M1}$ | $Y_{M2}$ | $Y_{M3}$ | ------ | $Y_{Mn-1}$ | $Y_{Mn}$ |
| | | C | $C_{M1}$ | $C_{M2}$ | $C_{M3}$ | ------ | $C_{Mn-1}$ | $C_{Mn}$ |
| 233 { | Y | Y | $Y_{Y1}$ | $Y_{Y2}$ | $Y_{Y3}$ | ------ | $Y_{Yn-1}$ | $Y_{Yn}$ |
| | | C | $C_{Y1}$ | $C_{Y2}$ | $C_{Y3}$ | ------ | $C_{Yn-1}$ | $C_{Yn}$ |
| | | M | $M_{Y1}$ | $M_{Y2}$ | $M_{Y3}$ | ------ | $M_{Yn-1}$ | $M_{Yn}$ |

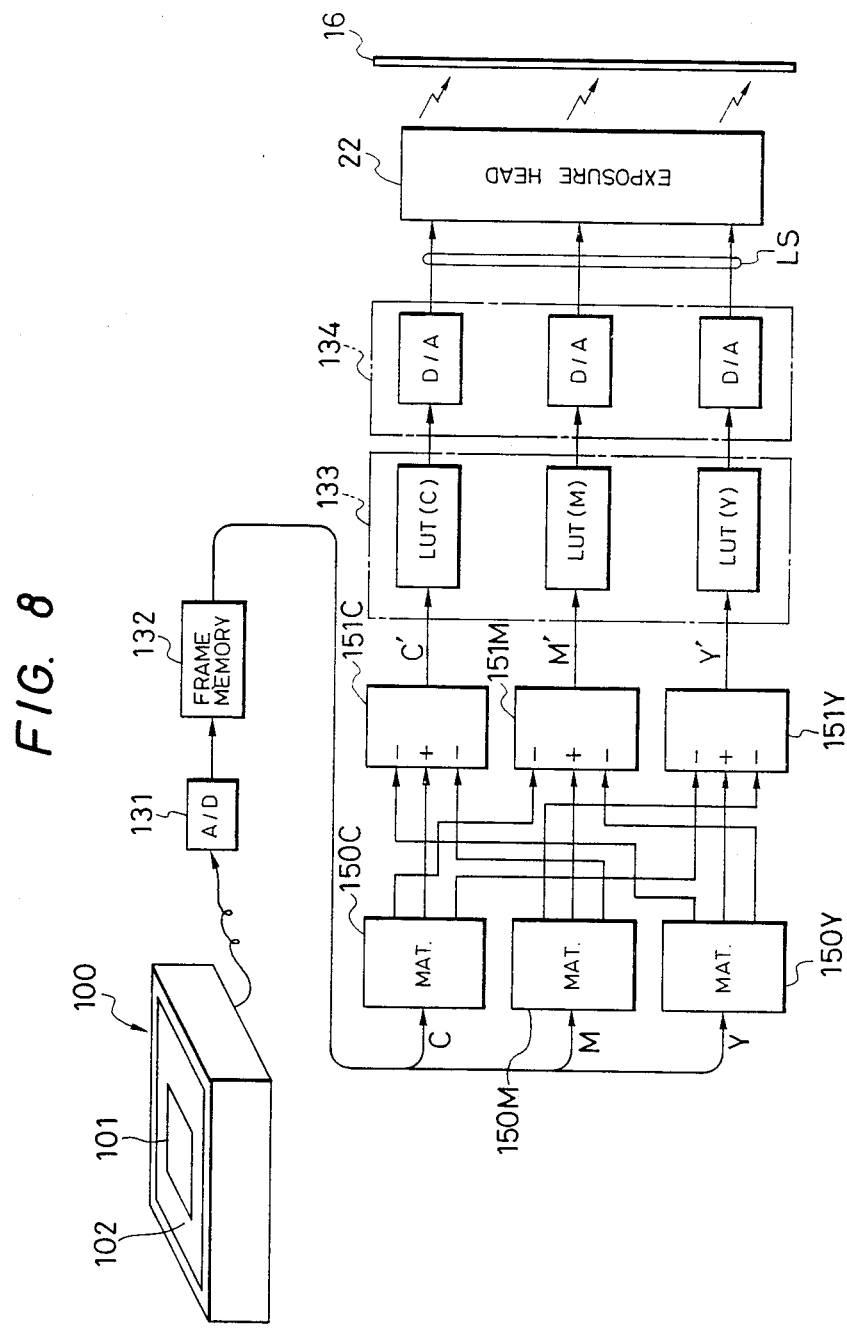

COLOR SIGNAL CONVERSION METHOD FOR IMAGE COPYING

BACKGROUND OF THE INVENTION

This invention relates to a signal conversion method for color image copying in a machine employing a thermally developable photosensitive material, a thermal transfer image copier, a laser beam printer, or the like.

When an original color image is scanned and converted into electrical signals which are thereafter processed and used to control the scanning of a photosensitive material by a recording head to thereby copy or reproduce the image, the fidelity of the copy is of paramount importance. A problem in this regard, however, is that the photosensitive recording material has spectral absorption characteristics such that cyan (C), magenta (M) and yellow (Y) colors become superimposed on one another when the material is irradiated with red (R), green (G) and blue (B) light during the copying process, as shown in FIG. 2, which results in an improper and undesired mixture of the C, M and Y colors. In addition, the spectral sensitivities of R, G and B decomposition systems are also superimposed on one another to some degree during the initial reading or scanning of the colored image to be reproduced. Accordingly, the scanner output representing the cyan component of the image will invariably include undesired portions of the magenta and yellow components.

A method of compensating for the improper coloring phenomena described above is disclosed in Japanese Kokai No. 14572/85, but this does not involve any photosensitive material and only treats false coloring caused by the spectral sensitivity characteristics of the light sources used. Such a method is thus inapplicable to a color copier machine, and a need therefore exists for a color signal conversion method in which the decomposition errors generated in reading a colored image can also be compensated for.

SUMMARY OF THE INVENTION

It is thus an object of this invention to provide a color signal conversion method for image copying in which the spectral absorption characteristics of a recording material, and reading errors/inaccuracies due to decomposition effects, are compensated to chromatically record an original image with a high degree of fidelity.

Such object is implemented by initially creating a color gradation or shade wedge at the output end of the machine, using stored step tablet signals, and thereafter scanning the shade wedge as an original to derive mixture component signals which are subsequently subtracted from the scanner outputs during processing to compensate for the overlapping absorption characteristics of the recording material and the superimposed spectral sensitivities of the scanner.

BRIEF DESCRIPTION OF THE DRAWINGS

FIG. 8 shows a block diagram for describing a method in accordance with another embodiment of the invention.

DETAILED DESCRIPTION OF THE PREFERRED EMBODIMENTS

Figures 3, 5:
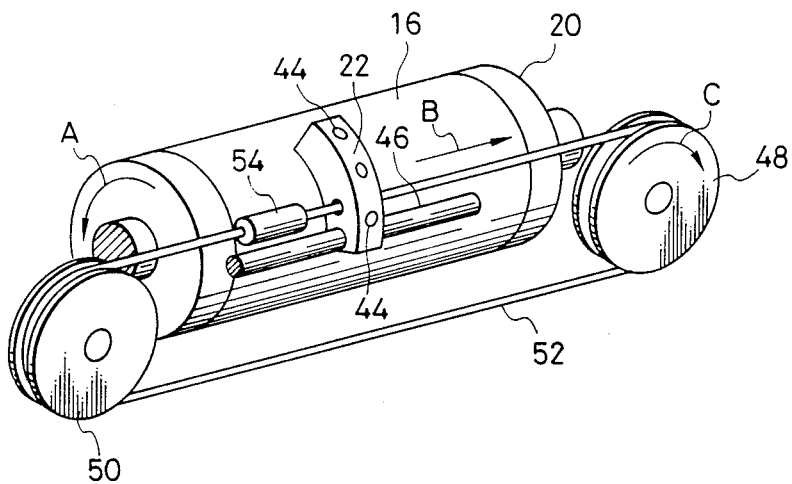
FIG. 3 shows an example of a lookup table provided in accordance with the invention.
FIG. 5 shows a perspective view of the exposure section of the copying machine.
Figure 4:
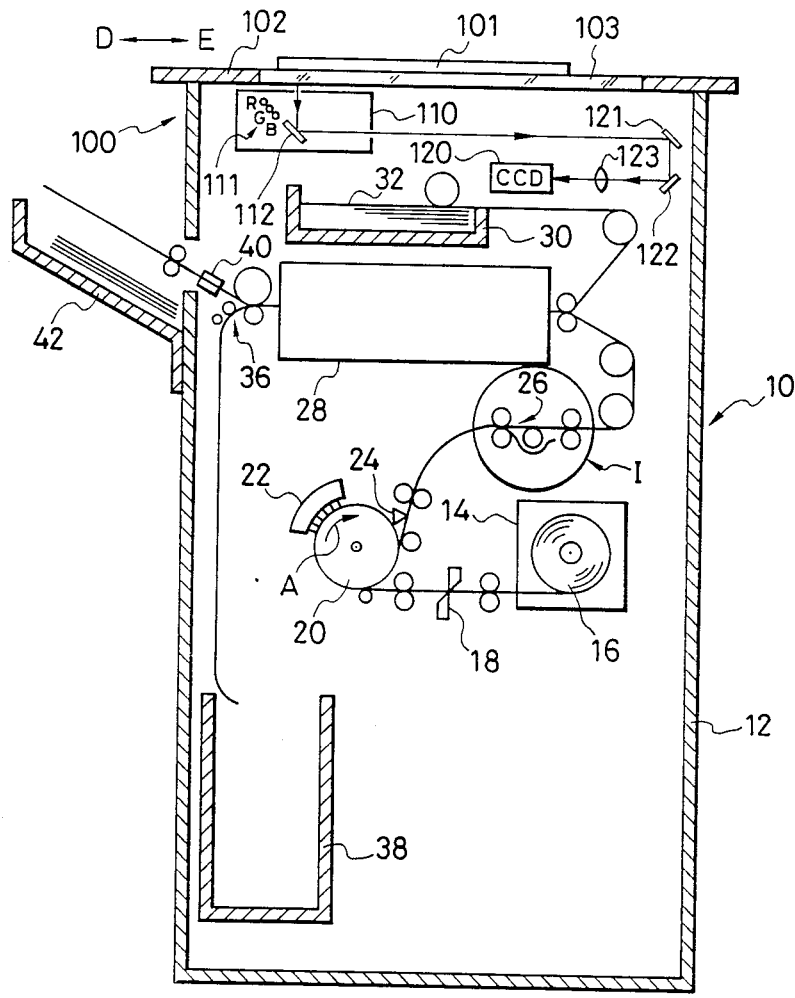
FIG. 4 shows a schematic sectional view of a copying machine which employs a thermally developable photosensitive material and to which the invention can be applied.

Referring to FIGS. 4 and 5, a cartridge 14 containing a roll of thermally developable photosensitive material 16 is loaded into the body or housing 12 of a copying machine 10. A prescribed length of the photosensitive material is pulled out from the cartridge, severed by a cutter 18, and wound onto the peripheral surface of an exposure drum 20 as shown by arrow A. An exposure or recording head 22 is disposed confronting the surface of the drum 20. After exposure, the drum 20 is rotated in a reverse direction (counterclockwise in FIG. 4) and the photosensitive material is separated from the drum by a scraper 24 and conveyed to a development and transfer section 28 through a water application section 26.

A sheet of image receiving material 32 stocked in a tray 30 is conveyed to the development and transfer section 28 and overlaid on the exposed photosensitive material 16. The two materials 16 and 32 are heated in the development and transfer section to develop the image on the photosensitive material 16 and transfer it to the image receiving material 32, whereafter after which the material 16 is conveyed into a waste tray 38 through a separation section 36, and the image receiving material 32 is conveyed through a drying section 40 into a takeout tray 42 on the side of the machine.

An image reading section 100 for scanning an original 101 is provided at the top of the copying machine. The original is placed on the glass window 103 of a platen 102 which can be moved in directions D and E to implement the scanning operation. A light source section 110 is disposed beneath the window to irradiate the original 101 with rays of red, green and blue light, and to receive the light rays reflected by the original. The light source section 110 includes lamps 111 which individually emit light rays in the three primary colors, and a mirror 112 which redirects the reflected light rays.

The reflected rays are further redirected by mirrors 121 and 122, and are then focused by a lens 123 onto an image reading element 120 such as a charge coupled device. Image signals for the three primary colors of the original 101 outputted by the reading element 120 are subjected to prescribed image processing, whereafter they are supplied to the exposure head 22.

As shown in FIG. 5, the exposure drum 20 is rapidly rotated about its axis in direction A with the thermally developable photosensitive material 16 wound on its surface to implement scanning in a main or first direction. The exposure head 22 is provided with light sources 44 such as light emitting diodes for the three primary colors, and is movable on a guide bar 46 extending parallel to the drum axis in direction B to implement scanning in an auxiliary or second direction. To such end a wire 52 is wound around a pair of spaced pulleys 48 and 50 with its opposite ends secured to the exposure head 22, one via a tensioning device 54 such as a helical spring. The pulley 48 is connected to a drive motor, not shown, while the pulley 50 serves as a driven or idler pulley.

With the exposure drum 20 and the severed length of photosensitive material 16 wound thereon being rapidly rotated in direction A by a drive motor, not shown, the exposure head 22 is advanced in direction B by the rotation of pulley 48 in a clockwise direction (arrow C) with the light sources 44 appropriately controlled by the processed outputs from the reading element 120. The direct advance of the head 22 via drive pulley 48 and the continuous run of the rigid wire 52 between the pulley and the head ensures the positional accuracy of the advance and avoids any vibration induced errors which might result from driving the head via the tensioning device 54. After exposure the drum 20 is rotated in a revers direction to separate the material 16 therefrom as described above and deliver it to the development and transfer section 28.

The water applied to the emulsion surface of the photosensitive material in the water application section 26 enhances the subsequent contact between such material and the overlaid sheet material 32 in the development and transfer section 28, to thus ensure a complete and uniform image transfer.

Figure 1:
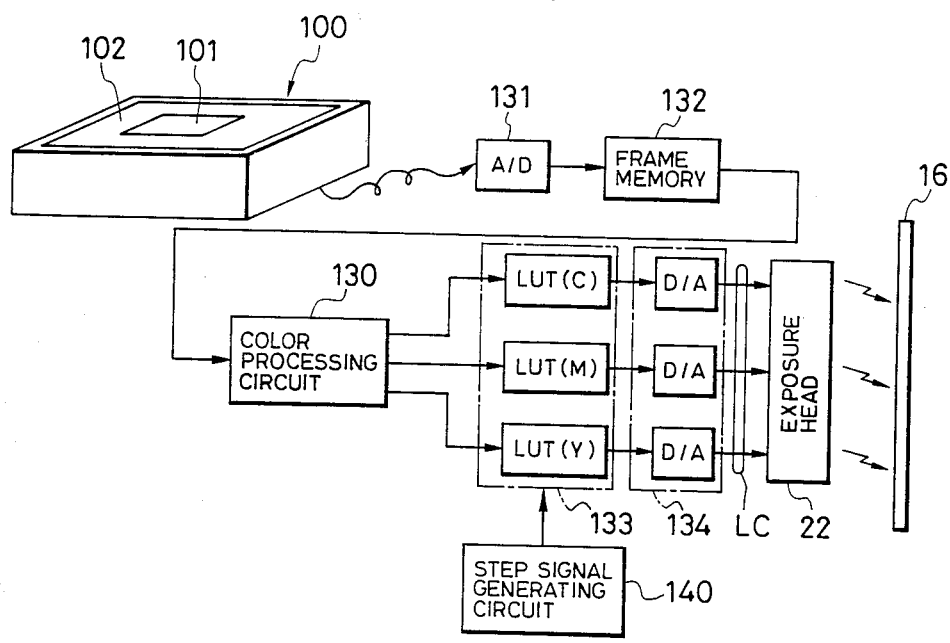
FIG. 1 shows a block diagram for describing a method according to an embodiment of the invention.

Referring to FIG. 1, the signals photoelectrically read from the colored original 101 by the image reading element 120 are fed through an A/D converter 131 and temporarily stored in a frame memory 132. The digital image data in the memory 132 are sequentially read out, one frame at a time, and subjected to processing such as color conversion in a color processing circuit 130. The data are then entered into a lookup table (LUT) 133 for gradation conversion for each color, and are thereafter fed through a D/A converter 134 to produce analog light quantity control signals LC for the three primary colors. These analog signals are then supplied to the exposure head 22 to record the image of the color original 101 on the thermally developable photosensitive material 16.

It will be understood from the above description that the relationship between the input image (the original) and the output image (the copy) can greatly differ depending on the contents of the LUT 133. In addition, the problem of improper coloring needs to be resolved.

Figure 2:
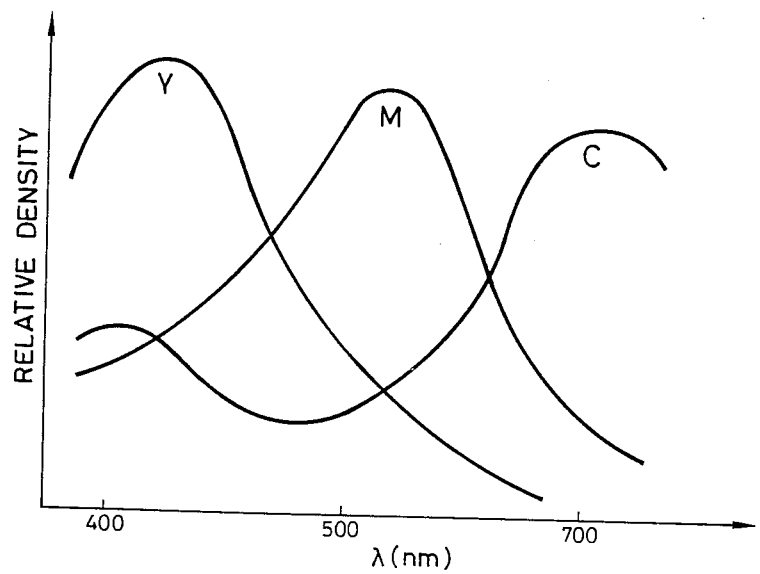
FIG. 2 is a plot showing the overlapping absorption characteristics of a thermally developable photosensitive material.
Figure 6:
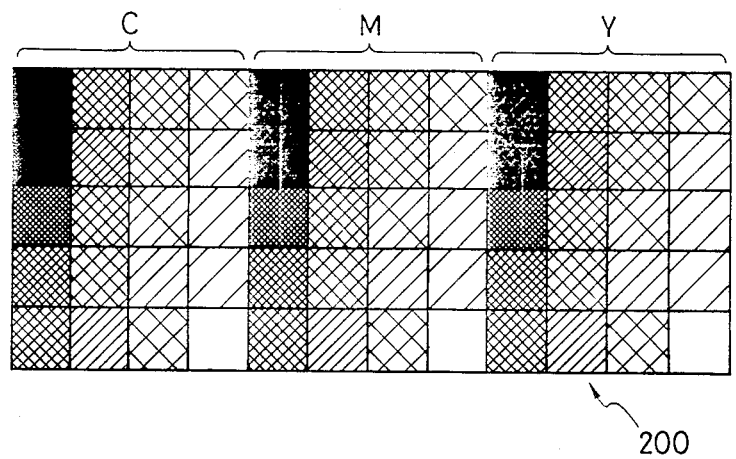
FIG. 6 shows an example of a shade wedge used in the invention.

In an embodiment of the invention, step tablet signals for cyan, magenta and yellow of prescribed gradations are outputted from a step signal generation circuit 140 and entered into the D/A converter 134 via the LUT such that these signals are converted into the analog light quantity control signals LC. The exposure head 22 is then driven as described above, so that the thermally developable photosensitive material 16 on the exposure drum 20 is sequentially and stepwise exposed to rays of light of the three primary colors R, G and B whose quantities correspond to the light quantity control signals LC. The photosensitive material 16 exposed to the rays of light is developed so that a shade wedge 200 having gradations for cyan, magenta and yellow as shown in FIG. 6 is created through the exposure according to the known image recording signals. The step shades of the wedge 200 for C, M and Y include improper absorption components resulting from the superposition of spectral absorptions as shown in FIG. 2.

Figure 7:
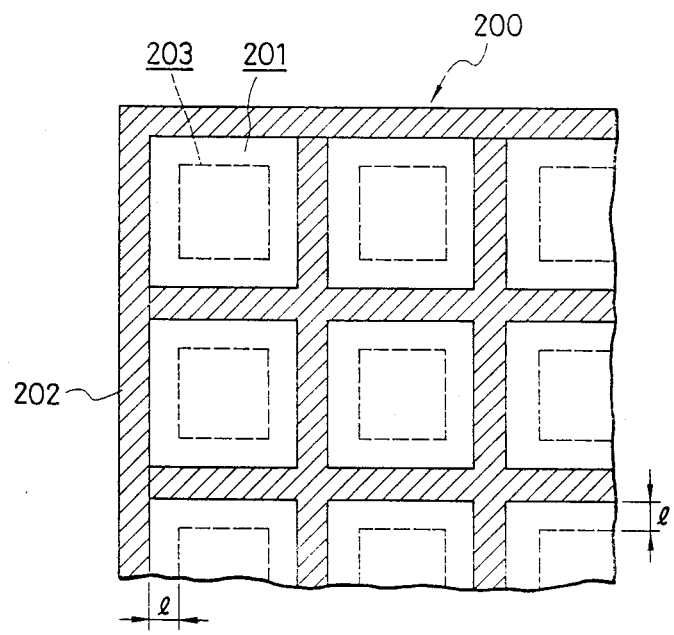
FIG. 7 illustrates the manner of reading the shade wedge.

The shade wedge 200 thus created for a test is set on the platen 102 of the image reading section 100 and photoelectrically scanned, for calibration. At that time, the shade steps 201 of the wedge are searched out as to cyan, magenta and yellow, as shown in FIG. 7. Black frame lines 202 are detected by checking whether or not the lowest shade is equal to or higher than a prescribed level $\epsilon$ for each of the C, M and Y colors. In order to prevent a blur in each shade step 201, the read value of the size (surface area) of a region 203 spaced a distance 1 from the detected black frame lines 202 is integrated (averaged). The integration prevents irregularities caused by noise in the A/D conversion, dust, etc. In addition, the measured data are smoothed to eliminate irregularities in shade.

The read values $ID_i/$ of the test shade wedge 200 scanned through the movement of the platen 102 and the operation of the light source section 110 are sent out from the image reading element 120 and converted into digital quantities by the A/D converter 131. The digital quantities are entered into the frame memory 132, and are thereafter entered into the color processing circuit 130.

Since the shade wedge 200 is read by the image reading section 100 while the wedge is being decomposed into its R, G and B colors, data on mixed other colors can be measured for the C, M and Y steps of the wedge. The data are determined as shown in FIG. 3. In the cyan step 231, for example, there are mixed magenta components $M_{C1}, M_{C2}, \ldots$ and $M_{Cn}$ and mixed yellow components $Y_{C1}, Y_{C2}, \ldots$ and $Y_{Cn}$ at cyan step shades $C_{C1}, C_{C2}, \ldots$ and $C_{Cn}$. The magenta and yellow steps 232, 233 similarly include components of the two other colors at each shade level. In no-data or unflat positions at the cyan, magenta and yellow step shades, interpolation, smoothing or the like is performed to thus create or compile an advance table of all data for the shade wedge 200.

When the original to be copied is ready by the image reading section 100, the mixed color data in the table of all data are read and then subtracted from the color signals for cyan, magenta and yellow read through decomposition. For example, when the cyan signal in an image signal generated by reading the original is at the cyan step shade $C_{C3}$, the magenta step shade $M_{C3}$ is subtracted from the magenta signal in the image signal and the yellow step shade $Y_{C3}$ is subtracted from the yellow signal in the image signal. The color signals from which the values of mixed color components are thus subtracted are sent out to the LUT 133 to perform chromatic copying at prescribed gradations. As a result, the color copy is free of undesired mixed color components, and its fidelity to the color of the original is high.

Although the data table is created beforehand, as shown in FIG. 3, in the above embodiment to remove the mixed color components by referring to the data table in each copying operation, the invention is not confined thereto but may be otherwise embodied so that coefficients $k_{11}$-$k_{33}$ for color conversion are determined from the data table using the method of least squares, and a calculation (1) described below is performed for reading image data on cyan, magenta and yellow to remove the mixed color components.

$$\begin{bmatrix} C' \\ M' \\ Y' \end{bmatrix} = \begin{bmatrix} k_{11} & k_{12} & k_{13} \\ k_{21} & k_{22} & k_{23} \\ k_{31} & k_{32} & k_{33} \end{bmatrix} \begin{bmatrix} C \\ M \\ Y \end{bmatrix} \quad (1)$$

FIG. 8 shows an example of a circuit configuration for performing calculation (1). In this embodiment, values resulting from the multiplication of the coefficients $k_{11}$-$k_{33}$ are determined from matrix tables 150C, 150M and 150Y, and the mixed color components are subtracted in addition/subtraction circuits 151C, 151M and 151Y.

Although a matrix circulation of 3×3 is preformed in this embodiment, constant terms may be utilized to perform a matrix calculation of 3×4, or a matrix of quadratic or higher degree may be used. The results of such matrix calculations may be stored in table form, and utilized during each copying operation.

What is claimed is:

1. In a color signal conversion method for image copying, in which a colored image (101) is scanned and converted into electrical signals which are processed to thereafter control the scanning of a recording material (16) by a recording head (22) to reproduce said colored image, a method for enhancing the fidelity of the reproduced image, comprising the steps of:
   (a) intitially determining the correlations between different colors in mixed color data due to:
      (1) the superposition of the spectral absorptions of three coloring layers of said recording material, and
      (2) the superposition of the spectral sensitivities of three-color decomposition systems in implementing said colored image scanning;
   (b) determining mixed color components for each color in terms of said correlations when said colored image is to be copied on said recording material;
   (c) subtracting said mixed color components from color signals; and
   (d) using the result of said subtracting step to reproduce said colored image.

2. A color signal conversion method according to claim 1, wherein the mixed color components based on the correlations are stored in a lookup table.

3. In a color signal conversion method for image copying, in which a colored image (101) is scanned and converted into electrical signals which are processed to thereafter control the scanning of a recording material (16) by a recording head (22) to reproduce said colored image, a method for enhancing the fidelity of the reproduced image, comprising the steps of:
   (a) initially determining the correlations between different colors in mixed color data due to:
      (1) superposition of the spectral absorptions of the three coloring layers of said recording material, and
      (2) the superposition of the spectral sensitivities of three-color decomposition systems in implementing said colored image scanning;
   (b) determining coefficients necessary for a copying calculation;
   (c) applying said coefficients and electrical signals to a prescribed calculation formula to obtain color signals free from mixed color components when said colored image is to be copied on said recording material; and
   (d) using said color signals to reproduce said colored image.

4. A color signal conversion method according to claim 3, wherein color signals based on the electrical signals are initially determined in accordance with a calculation formula to establish a data table; and data are read from said data table and used as color signals for said reproduction.

* * * * *